T. E. MURRAY.
METER TESTING CUT-OUT.
APPLICATION FILED JUNE 29, 1911.
1,028,254.
Patented June 4, 1912.
3 SHEETS—SHEET 1.
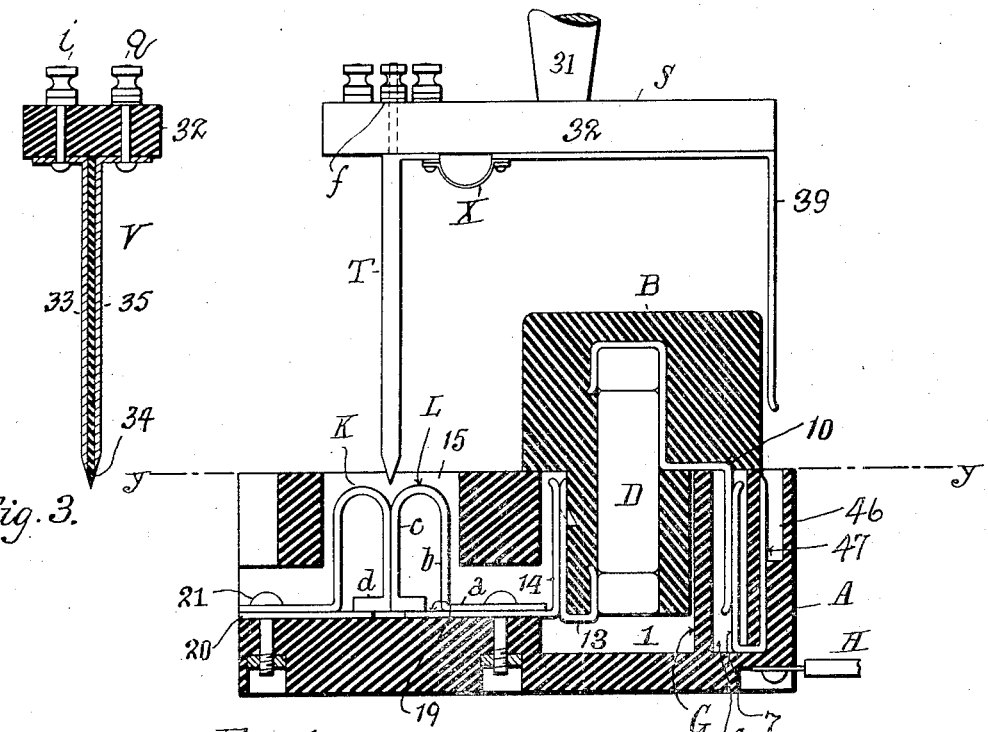
Fig. 3.
Fig. 1.
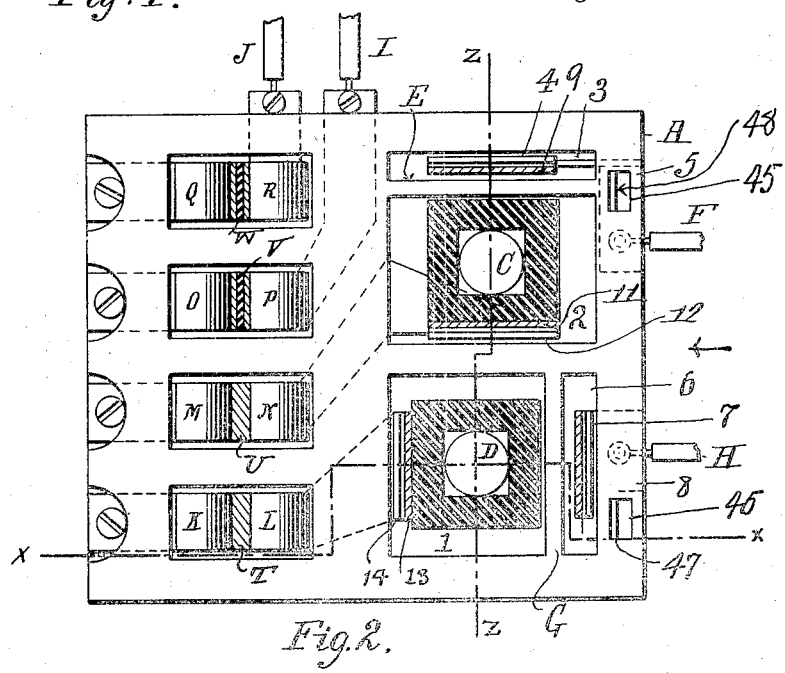
Fig. 2.
Witnesses:
Gertrude T. Porter
May V. McLarry
Inventor
Thomas E. Murray
By his Attorney

T. E. MURRAY.
METER TESTING CUT-OUT.
APPLICATION FILED JUNE 29, 1911.

1,028,254.

Patented June 4, 1912.
3 SHEETS—SHEET 2.

Witnesses:
Inventor
Thomas E. Murray
By his Attorney

T. E. MURRAY.
METER TESTING CUT-OUT.
APPLICATION FILED JUNE 29, 1911.
1,028,254.
Patented June 4, 1912.
3 SHEETS—SHEET 3.
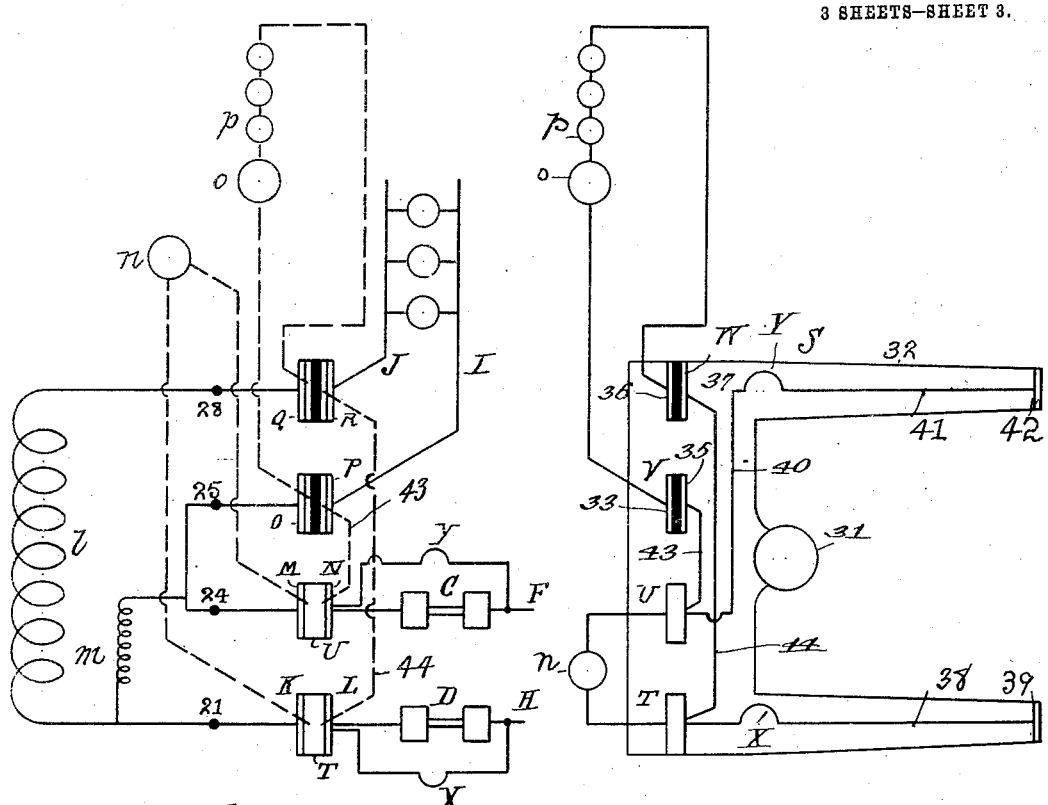
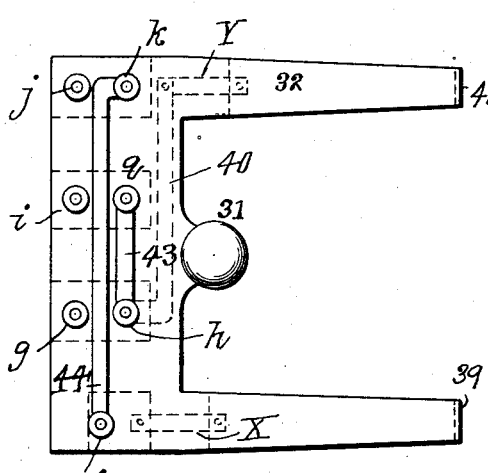
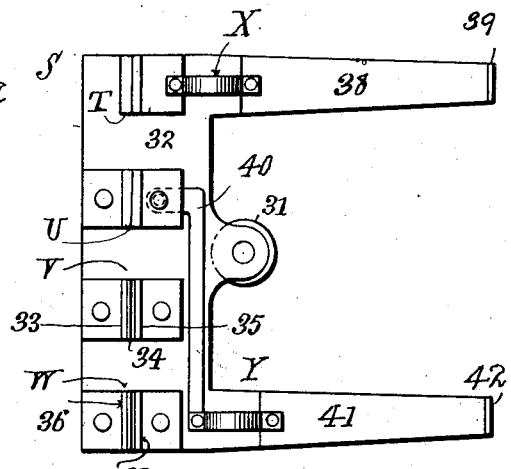
Witnesses:
Gertrude Porter
May T. McGarry
Thomas E. Murray
Inventor
By his Attorney

UNITED STATES PATENT OFFICE.

THOMAS E. MURRAY, OF NEW YORK, N. Y.

METER-TESTING CUT-OUT.

1,028,254.   Specification of Letters Patent.   Patented June 4, 1912.

Application filed June 29, 1911. Serial No. 636,016.

*To all whom it may concern:*

Be it known that I, THOMAS E. MURRAY, a citizen of the United States, residing at New York, in the county of New York and State of New York, have invented a certain new and useful Improvement in Meter-Testing Cut-Outs, of which the following is a specification.

The invention is a meter testing cut-out, and has for its object to provide means whereby the meter, the testing instruments and an auxiliary fuse, or fuses, in the testing circuit, may be connected with the service leads without disturbing local service to the customer: The object of the auxiliary fuse, or fuses, being to guard the main fuses from danger of overloading.

Figure 4:
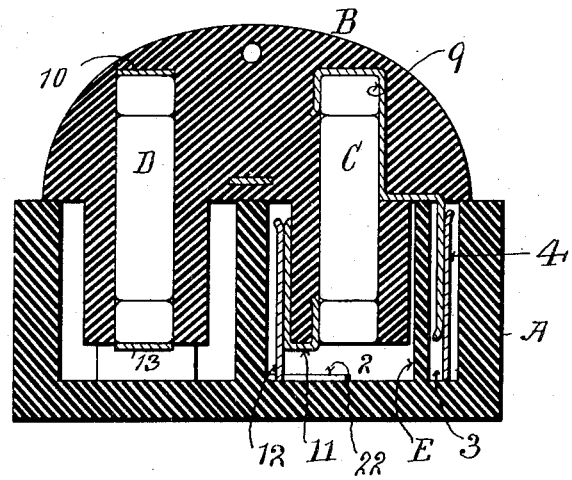
Figure 5:
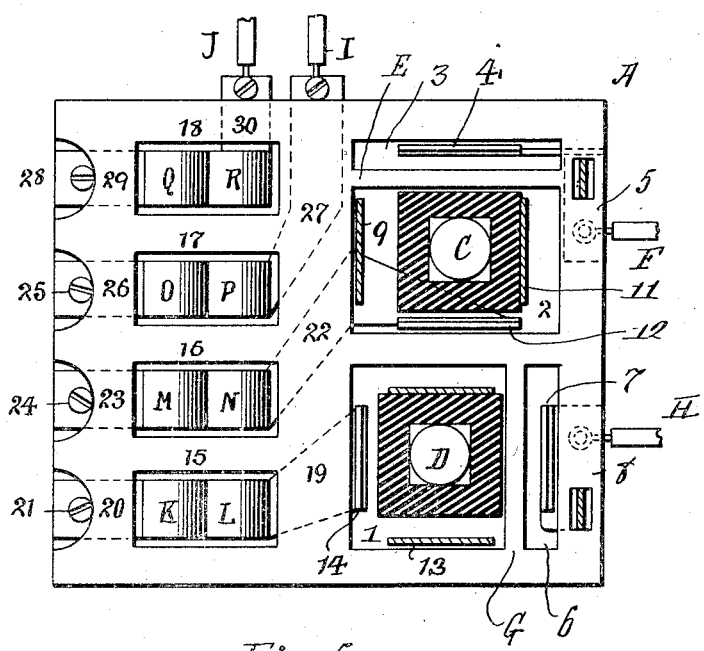

In the accompanying drawings—Figure 1 is a section of my device on the line $x$, $x$ of Fig. 2, showing the plug T in position to be inserted. Fig. 2 is a horizontal section on the line $y$, $y$ of Fig. 1, showing plugs T, U, V, W, in place between the pairs of contact plates on the base block. Fig. 3 is a vertical section through the gang plug support 32 and plug V on a line immediately adjacent to posts $i$, $q$. Fig. 4 is a section on the line $z$, $z$ of Fig. 2, taken in the direction of the arrow. Fig. 5 is a section similar to Fig. 2, the plugs T, U, V, W, being removed. Fig. 6 is a top and Fig. 7 a bottom view of the plug carrier. Figs. 8 and 9 are electrical diagrams. Fig. 8 shows separately the circuit connections on the gang plug carrier and from carrier to testing instruments. Fig. 9 shows all the circuit connections, with the plugs in place.

Similar numbers and letters of reference indicate like parts.

The base block A is made preferably of porcelain or other insulating refractory material, and is provided with sockets 1 and 2, to receive the legs of the fuse plug B. Said fuse plug, also of porcelain or the like, is internally recessed to receive the cartridge fuse cases C, D, provided with the usual metallic end caps. Adjacent to the socket 2, and separated therefrom by a barrier or partition E, is a recess 3 in which is disposed a vertical contact plate 4, which is electrically connected to a plate 5, and said plate 5 is in turn connected to service lead F.• Adjacent to the socket 1, and separated therefrom by a barrier or partition G, is a recess 6 in which there is disposed a vertical contact plate 7, which is electrically connected to a plate 8, and said plate 8 is in turn connected to the service lead H. The recesses 3 and 6 are disposed relatively at right angles.

The recess in plug B, which receives the fuse case C, Fig. 4, contains a contact plate 9, bent over to form a clip to hold the upper end cap of said case. Said plate extends down said recess, is bent at right angles to pass through the wall of the plug and above the barrier E, and then is bent vertically again to enter recess 3 and establish contact with plate 4 therein. Within the recess, Fig. 1, in plug B, which receives the fuse case D, is a contact plate 10, bent over to form a clip to hold the upper end cap of said case. Said plate 10 extends down said recess, is bent at right angles to pass through the wall of the plug and above the barrier G, and is then bent vertically again to enter recess 6 and establish contact with plates 7 therein.

On the leg of plug B, which enters socket 2, Fig. 4, is a contact plate 11 which is suitably bent to enter the recess in said plug, which receives fuse case C, and to make contact with the lower end cap of said case. Extending upwardly from the bottom of socket 2 is a spring contact plate 12 which bears on contact plate 11 when the plug B is in the position shown in Figs. 2 and 4. On the leg of the plug B, which enters socket 1, is a contact plate 13 which is suitably bent to enter the recess in said plug, which receives fuse case D, and to make contact with the lower end cap of said case. Extending upwardly in socket 1 is a spring contact plate 14 which bears on contact plate 13 when the plug B is in the position shown in Figs. 1 and 5.

It will be apparent, that if for the moment we suppose the plates 12 and 14 to be electrically connected and the plug B to be in the position shown in Figs. 1 and 2, then circuit will be closed from main H, to fuse case D, through the fuse therein, to contact plate 13, to contact plate 14, to fuse case C, through the fuse therein, to contact plate 11, contact plate 12, to main F. If the fuse plug be now reversed end for end, so that the leg which formerly entered socket 1 enters socket 2, and conversely, then the conditions shown in Fig. 5 will be established, and circuit will be broken at both fuse cases, because the contact plate 13 will no longer meet contact plate 14, nor will the contact plate 11 meet contact plate 12. In this way, simply by removing plug B, reversing it and replacing it in its sockets, both fuses may be cut into or out of circuit, at will.

In the base block A are four recesses 15, 16, 17, 18 Fig. 5. Extending from contact plate 14 in socket 1 is a metal strip 19 which enters recess 15. From recess 15 a strip 20 extends to an edge notch in block A, where it has a binding screw 21. Extending from contact plate 12 in socket 2 is a metal strip 22 which enters recess 16. From recess 16 a strip 23 extends to an edge notch in block A, where it has a binding screw 24. Extending from an edge notch in block A, where it has a binding screw 25, is a metal strip 26 which enters recess 17. From recess 17 a strip 27 extends to customer's lead I. Extending from an edge notch in block A, where it has a binding screw 28, is a metal strip 29 which enters recess 18. From recess 18 a strip 30 extends to customer's lead J.

Secured within the recesses 15, 16, 17, 18, and bridging the metal strips therein, are pairs of spring contacts K, L: M, N: O, P: Q, R. The bottom portion $a$ of each member of the pair is flat and rests upon the strips beneath. Rising therefrom is a vertical portion $b$, which is bent over to form a parallel vertical portion $c$, which is finally turned at right angles at $d$ toward the standing part $b$. The under sides of the right angled portions $d$ meet the metal strips beneath them. The parallel vertical portions $c$ of the members of each pair are normally in contact. The purpose of this construction will be hereinafter explained.

S is a gang plug carrier, having a bifurcated support 32, preferably formed of refractory insulating material, provided with a handle 31. On the under side of support 32 are four plugs. Plugs T and U are of solid metal. Plug V is made of two plates of metal, 33, 35, separated by a plate of insulating material 34, Fig. 3. Plug W is made of two plates of metal, 36, 37, separated also by a plate of insulating material. Plug T is connected to an auxiliary fuse X, which in turn is connected to a plate 38 on the under side of support 32, which plate is bent downwardly, as shown at 39 Figs. 1, 6 and 7. Plug U is connected by a bar 40 to an auxiliary fuse Y, which in turn is connected to a plate 41 on the under side of support 32, which plate is bent downwardly, as shown at 42. Plug T is connected to a binding post $f$ on top of support 32. Plug U is connected to two binding posts $g$, $h$ on top of support 31. Plate 33 of plug V is connected to a binding post $i$. Plate 35 of plug V is connected to binding post $q$ and to bar 40, by a bridge 43 on top of support 32. Plate 36 of plug W is connected to binding post $j$. Plate 37 of plug W is connected to binding post $k$, and by a bridge 44 on top of support 32, to binding post $f$.

Under normal conditions, the carrier S not being inserted, the circuit is as follows: The terminals of the meter (of which $l$ indicates the field and $m$ the armature coil, in Fig. 9) are connected to the binding screws 21, 24, 25, 28, in the usual way. Circuit then proceeds from service lead H, to main fuse D, contact plates K, L, meter field coil $l$, contact plates Q, R, to customer's lead J, the load, customer's lead I, contact plates O, P, contact plates M, N, fuse C, and service lead F.

The testing instruments are connected to the carrier S, the voltmeter $n$ being connected to binding posts $g$, $f$, and hence to plugs U, T, and the ammeter $o$ and artificial load $p$ being connected to binding posts $i$, $j$, and hence to plates 33 and 36 of plugs V, W.

When the carrier S is inserted in place, plugs T, U, V, W enter between the pairs of spring contact plates K, L, etc., as shown in Figs. 2 and 9, the plugs V, W then electrically separating the members of the pairs O, P and Q, R. The plates 39 and 42 enter recesses 45 and 46 in the base block A, in which recesses are contact plates 47, 48, connected to plates 5 and 8. Hence plates 39 and 42 close contact with plates 47, 48, thus bringing the auxiliary fuses X, Y in shunt with the main fuses C, D.

The effect then is—

(1) To short-circuit out the meter without interrupting service to the customer, the circuit proceeding as follows, (Fig. 9:) from service lead H, to main fuse D, contact plate L, bridge 44, contact plate R, customer's lead J, the load, customer's lead I, contact plate P, bridge 43, main fuse C, and service lead F.

(2) To establish the testing circuit, including the auxiliary fuses X, Y, which proceeds as follows: from service lead H, to auxiliary fuse Y, by plate L, plug T and plate K, to meter field coil $l$, to plate Q, ammeter $o$ and artificial load $p$, plate O, plate M, plug U, plate N, auxiliary fuse X, and service lead F. And between plates M, K, through the voltmeter $n$. The meter may then be tested in the usual manner.

It is to be particularly noted that by the insertion of the plugs T, U, V, W, 39, 42, all on the common support or carrier S, I do three things: 1st. Continue service to the local or customer's circuit from the supply mains. 2nd. Connect the meter to the testing instruments. 3rd. And simultaneously connect auxiliary fuses X, Y, in shunt with the main fuses C, D. This simultaneous connecting in of the auxiliary fuses is especially important, in that it permits me to use any desired artificial load for testing purposes, without endangering the main fuses. It sometimes happens that the local or customer's load may require the full capacity of the main fuses, and hence the addition of the testing load may imperil them. Or even when such is not the case, it is often desirable to test the meter under both small and large artificial loads. In the latter event, the main fuses might again be endangered. In brief, the addition of the auxiliary fuses increases the total fuse capacity of the system to such a predetermined extent as will enable the use of whatever artificial load may be selected, without over-taxing that capacity.

I claim:

1. In combination with service leads and a fuse, means for simultaneously connecting in said leads an auxiliary load, and an auxiliary fuse.

2. In combination with service leads, a meter and a fuse, means for simultaneously connecting in said leads testing devices for said meter, and an auxiliary fuse.

3. In combination with service leads, a fuse and a load, means for varying the load, and for simultaneously varying the fuse capacity in circuit proportionately to the load variation.

4. In combination with service leads and fuses therein, a meter, testing means therefor, an auxiliary load, an auxiliary fuse, and removable means for short-circuiting the service leads to the load and for connecting said auxiliary load, auxiliary fuse and testing means to said meter and to said service leads: the auxiliary fuse to coöperate with one of the first-named fuses.

5. A base block, a removable carrier, contacts on said block, contacts on said carrier coöperating with said block contacts, a meter, service and load leads connected to said block contacts, and, in circuit with said carrier contacts, meter testing means and a fuse; the aforesaid parts being constructed and arranged so that upon the coöperation of said carrier and block contacts, said service leads shall be short-circuited to the load and said auxiliary load and said fuse shall be connected in circuit with said service leads and said meter.

6. A base block, a removable carrier, contacts on said block, contacts on said carrier coöperating with said block contacts, a meter, service and load leads connected to said block contacts, and, in circuit with said carrier contacts, an auxiliary load, measuring instruments and a fuse; the aforesaid parts being constructed and arranged so that upon the coöperation of said carrier and block contacts, said service leads shall be short-circuited to the load and said auxiliary load, fuse and measuring instruments shall be connected in circuit with said service leads and said meter.

7. A base block, a removable carrier, contacts on said block, contacts on said carrier coöperating with said block contacts, a meter and service and load leads connected to said block contacts, a fuse in said block interposed in said service leads, and, in circuit with said carrier contacts, meter testing means and an auxiliary fuse; the aforesaid parts being constructed and arranged so that upon the coöperation of said carrier and block contacts, said service leads shall be short-circuited to the load and said meter testing means and auxiliary fuse shall be connected in circuit with said service leads and said meter.

In testimony whereof I have affixed my signature in presence of two witnesses.

THOMAS E. MURRAY.

Witnesses:
GERTRUDE T. PORTER,
MAY T. McGARRY.